US010111215B2

(12) United States Patent
Yu et al.

(10) Patent No.: US 10,111,215 B2
(45) Date of Patent: Oct. 23, 2018

(54) DEVICE-TO-DEVICE DISCOVERY RESOURCE ALLOCATION IN COMMUNICATIONS

(71) Applicant: Nokia Solutions and Networks Oy, Espoo (FI)

(72) Inventors: Ling Yu, Kauniainen (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 291 days.

(21) Appl. No.: 15/027,017

(22) PCT Filed: Nov. 1, 2013

(86) PCT No.: PCT/EP2013/072875
§ 371 (c)(1),
(2) Date: Apr. 4, 2016

(87) PCT Pub. No.: WO2015/062671
PCT Pub. Date: May 7, 2015

(65) Prior Publication Data
US 2016/0242152 A1   Aug. 18, 2016

(51) Int. Cl.
*H04W 72/04* (2009.01)
*H04W 76/14* (2018.01)
(Continued)

(52) U.S. Cl.
CPC .......... *H04W 72/042* (2013.01); *H04W 4/70* (2018.02); *H04W 8/005* (2013.01); *H04W 24/02* (2013.01); *H04W 72/085* (2013.01); *H04W 76/14* (2018.02)

(58) Field of Classification Search
CPC ... H04W 72/042; H04W 4/005; H04W 8/005; H04W 24/02; H04W 72/085; H04W 76/023
See application file for complete search history.

(56) References Cited

U.S. PATENT DOCUMENTS 9,100,846 B2    8/2015 Bodog
2010/0190488 A1  7/2010 Jung
(Continued)

FOREIGN PATENT DOCUMENTS

GB    2 051 118 A      1/1981
WO    WO 2011/063845 A1  6/2011
WO    WO 2011/069295 A1  6/2011

OTHER PUBLICATIONS

3GPP TSG-RAN WG2 #83 Bis, Oct. 7-11, 2013, Ljubljana, Slovenia, R2-133482, "D2D Discovery", Qualcomm Inc., 8 pgs.
(Continued)

*Primary Examiner* — Ian N. Moore
*Assistant Examiner* — Brian T Le
(74) *Attorney, Agent, or Firm* — Harrington & Smith

(57) ABSTRACT

A method for device-to-device communication includes receiving, in a D2D-capable user terminal from a network apparatus, measurement configuration information regarding a D2D discovery resource usage status. The user terminal performs, based on the received measurement configuration information, a corresponding measurement to determine the usage status of D2D discovery resources. The user terminal transmits, to the network apparatus, a report on the measurement performed in the user terminal, the report indicating the usage status of D2D discovery resources, in order the network apparatus to be able to adjust D2D discovery resource allocation based on the report.

19 Claims, 3 Drawing Sheets

(51) Int. Cl.
*H04W 4/70* (2018.01)
*H04W 8/00* (2009.01)
*H04W 72/08* (2009.01)
*H04W 24/02* (2009.01)

(56) References Cited

U.S. PATENT DOCUMENTS

| | | | |
|---|---|---|---|
| 2011/0287794 A1* | 11/2011 | Koskela | H04W 28/08 |
| | | | 455/509 |
| 2012/0082051 A1 | 4/2012 | Kim | |
| 2012/0275366 A1 | 11/2012 | Anderson | |
| 2013/0258996 A1 | 10/2013 | Jung et al. | 370/330 |
| 2014/0112194 A1* | 4/2014 | Novlan | H04W 48/16 |
| | | | 370/254 |

OTHER PUBLICATIONS

3GPP TSG-RAN WG2 #83bis, Ljubljana, Slovenia, Oct. 7-11, 2013, Tdoc R2-133501, "Support of Device-to-Device Discovery in IDLE mode", InterDigital Communications, 4 pgs.

* cited by examiner

DEVICE-TO-DEVICE DISCOVERY RESOURCE ALLOCATION IN COMMUNICATIONS

FIELD OF THE INVENTION

The exemplary and non-limiting embodiments of this invention relate generally to wireless communications networks, and more particularly to device-to-device discovery.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

Direct communication between user equipment devices in LTE-advanced cellular networks may also be referred to as device-to-device (D2D) communication. Device-to-device communication may reuse cellular resources within a cell to increase efficiency of the cellular communication system. A network operator may control the communication process to provide better user experience and make profit accordingly. The two devices in the D2D communication may apply radio resources of the mobile communication network, thus sharing the resources with devices that are communicating with the base station eNB in the conventional link. This way the users of the devices may obtain better quality of service (QoS), new applications and increased mobility support. The connections between the user equipment (UE) devices participating in the D2D communication, may be set up in an ad-hoc manner, with or without the control of eNB. The devices are required to discover each other and their services when the devices are within radio coverage of each other. For this, an often applied solution is to have the devices broadcast some individual predefined beacons that are unique among the local network of D2D devices to advertise itself for node discovery. 3GPP services and requirements for D2D communications may be referred to as proximity services (ProSe).

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, an apparatus, and a computer program product as defined in the independent claims. Further embodiments of the invention are disclosed in the dependent claims.

An aspect of the invention relates to a method for D2D communication in a communications system, the method comprising transmitting, from a network apparatus to a D2D capable user terminal, measurement configuration information regarding a D2D discovery resource usage status; receiving, in the network apparatus from the D2D capable user terminal, a report on a corresponding measurement performed in the user terminal, the report indicating a usage status of D2D discovery resources; and adjusting D2D discovery resource allocation based on the received report.

A further aspect of the invention relates to a method for D2D communication in a communications system, the method comprising receiving, in a D2D capable user terminal from a network apparatus, measurement configuration information regarding a D2D discovery resource usage status; performing, based on the received measurement configuration information, a corresponding measurement in the user terminal to determine a usage status of D2D discovery resources; and transmitting, to the network apparatus from the user terminal, a report on said measurement performed in the user terminal, the report indicating the usage status of D2D discovery resources, in order the network apparatus to be able to adjust D2D discovery resource allocation based on the report.

A still further aspect of the invention relates to an apparatus comprising at least one processor; and at least one memory including a computer program code, wherein the at least one memory and the computer program code are configured to, with the at least one processor, cause the apparatus to perform any of the method steps.

A still further aspect of the invention relates to a computer program product comprising program instructions which, when run on a computing apparatus, causes the computing apparatus to perform the method.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
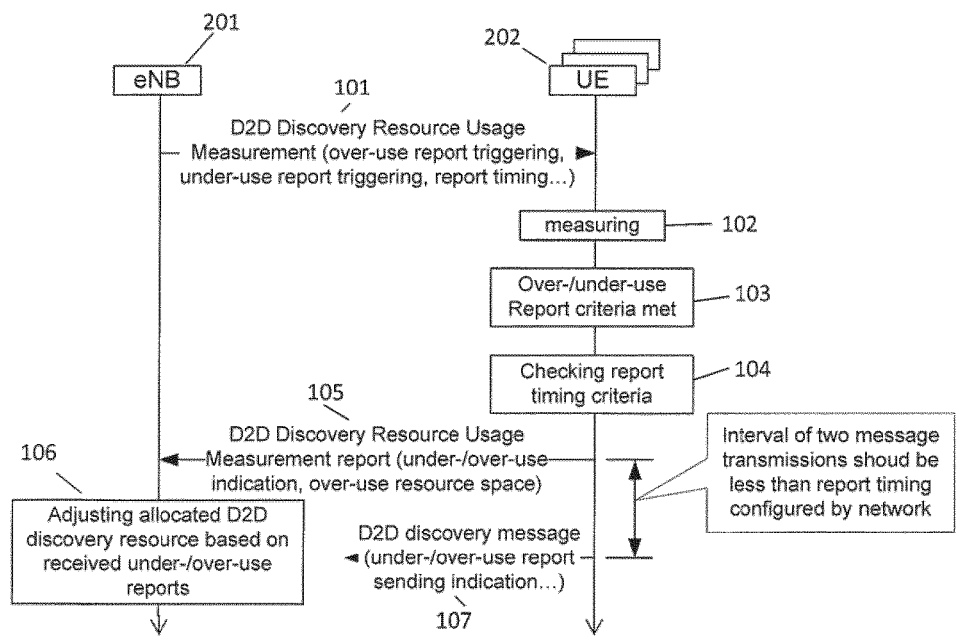
FIG. 1 shows a messaging diagram illustrating exemplary D2D discovery resource usage measurement procedure with common control signalling.

An exemplary embodiment is related to proximity services (ProSe) and device-to-device (D2D) communications which have been studied in 3GPP for possible standardization in future releases (Rel 12/13 and beyond). More particularly, an exemplary embodiment is related to resource allocation for in-network coverage D2D discovery.

Contributions of RAN2#83bis have shown that the so-called type 1 (non-UE-specific) resource allocation for D2D discovery is a preferable scheme for majority of the companies. Herein, the type 1 resource allocation means that a resource pool for D2D discovery signal transmission is allocated on a non-UE-specific basis, and each user equipment (UE) selects one of the discovery resources from the discovery resource pool. For the type 1 resource allocation, a collision may happen if two or more UEs select the same discovery resource for D2D discovery signal transmission. However, the collision rate is highly related to the amount of available D2D discovery resources versus the number of UEs that participate in the D2D discovery signal transmission. To control the collision rate under a certain managed level, sufficient D2D discovery resources are to be reserved. From radio resource/spectrum efficiency and UE power consumption of D2D discovery perspective, however, it is not preferable to reserve too much unnecessary D2D discovery resources. Therefore, how to allow a network to be aware of a D2D discovery resource usage status in order to allocate proper D2D discovery resources accordingly, is an issue in the type 1 resource allocation scheme, especially if idle-mode UEs need to be supported for the D2D discovery signal transmission.

An exemplary embodiment considers the type 1 resource allocation scheme for the D2D discovery in which certain radio resources are reserved as the D2D discovery resource pool, and pool information is indicated to D2D UEs in the broadcasted system information. Multiple type 1 resource pools may be reserved for different D2D UE groups (e.g. one pool for cluster head UEs and another pool for cluster member UEs, or one pool for open discovery UEs and another pool for restricted discovery UEs, or one pool for active UEs and another pool for idle UEs, or different pools for different D2D range classes). Thus, an exemplary embodiment discloses enhanced measurements of D2D capable UEs to facilitate the D2D discovery resource allocation.

A solution exists to allow the user equipment UE to send an indication to the network when an autonomous discovery session is initiated or terminated, so that the network is aware of active D2D discovery signal transmission UEs. Then, for system simulation setup, it may be indicated that the allocated D2D discovery resources scale up based on the number of UEs. However, the network is not aware of the number of UEs that participate in the D2D discovery, especially if idle-mode UEs are involved.

A proposal exists including collision resolution options either with UE assistance, wherein UE that detects the collision, may notify the detected collision in its own D2D discovery signal, or with network assistance for connected mode UEs, wherein UE ID (e.g. C-RNTI) is configured to minimize a possible collision.

An exemplary embodiment enables an enhanced measurement for facilitating the D2D discovery resource allocation. An exemplary embodiment discloses enhanced measurements to D2D capable UEs and corresponding measurement configurations and reporting procedures in order to allow the network be aware of a usage status of the D2D discovery resources and then adjust the D2D discovery resource allocation accordingly.

In an exemplary embodiment for the configuration, the network provides measurement configuration information regarding the D2D discovery resource usage status with common control signalling (e.g. in broadcasted system information). The measurement configuration may include/define:

D2D discovery resource under-utilized report triggering: For example, a threshold of the number of free/occupied D2D discovery resources versus the total number of the D2D discovery resources to trigger an under-utilized report, and/or a threshold (e.g. in the number of the D2D discovery resources) of the D2D discovery resource pool under which the under-utilized report is not triggered.

D2D discovery resource over-utilized report triggering: For example, a threshold of the number of occupied/free D2D discovery resources versus the total number of the D2D discovery resources and/or the detected collision rate to trigger an over-utilized report, and/or a threshold (e.g. in the number of the D2D discovery resources) of the D2D discovery resource pool above which the over-utilized report is not triggered.

D2D discovery resource under-/over-utilized report timing: The number of sub-frames before next D2D discovery message transmission within which the under-/over-utilized report may be sent to the network. This is used to limit the time interval between sending of the under-/over-utilized report and transmitting of the next D2D discovery message so that the reporting UE is able to indicate that it has just send the report on the measured utilization of the discovery resources to the other UEs, in its next discovery message. The other UEs upon receiving that indication may decide not to report the same information to the network. Thus, among UEs within a certain proximity location of each other (which UEs are configured to measure and report about utilization of the discovery resources), only one of these UEs (e.g. the earliest one that has a D2D discovery message transmission occasion at the earliest time slot after the under-/over-utilized report is triggered), may at best need to report to the network. This enables reducing signalling overhead.

D2D discovery resource under-/over-utilized report interval: The minimum time period between two same (similar/same type/identical) reports (either same (similar/same type/identical) under-utilized reports or same (similar/same type/identical) over-utilized reports) from UEs in proximity if system information regarding the D2D discovery resource pool is not updated. If the measuring UE sees the same or unchanged situation on utilization of the discovery resources in its proximity between consecutive measurement occasions (e.g. pre-configured beaconing occasions) then the measuring UE may be configured not to report so frequently. Thus, if the measuring UE experiences the same situation as in connection with the previous preconfigured measuring occasion which was already reported then UE may skip reporting on the current occasion.

In an exemplary embodiment, omitting of the under/over-utilized report triggering item in measurement configuration information may indicate that no corresponding measurement and reporting is needed. Basically, an alternative to using explicit thresholds to implicitly disable the measurement and reporting is that the network may indicate explicitly whether the corresponding measurement and reporting is needed or not, depending on the current size of the allocated resource pool.

An exemplary embodiment for the measurement, the D2D capable UEs may trigger to send the under-utilized or over-utilized report based on the measurement configuration information. For the over-utilized report, the D2D discovery resource space in which the over-use (either in the form of an occupied resource or a detected collision) has been identified may also be reported. As the D2D capable UEs in proximity have a similar measurement result, multiple under-/over-utilized reports may be sent to the network by the D2D capable UEs in the proximity. To avoid such unnecessary duplicated reports from multiple D2D capable UEs in proximity, UE only sends the under-/over-utilized report within a configured number of sub-frames before next D2D discovery message transmission and then includes a report sending indication in D2D discovery messages to inform other UEs that an under-/over-utilized report has been sent to the network. The other D2D capable UEs, upon detecting the indication in one UE's D2D discovery message, do not send the under-/over-utilized report within the report interval configured by the network even if the configured/defined triggering condition is met. However, if broadcasted system information regarding the D2D discovery resource pool has changed, the under-/over-utilized report on updated D2D discovery resource pool is not to be limited by the report interval configured by the network.

In an exemplary embodiment, the network may use dedicated signalling to configure for the selected connected-mode UEs the measurement and the corresponding report. In this case, the measurement configuration may be more flexible. For example, it may be one-off, i.e. a selected UE needs to measure and report once, or it may be more frequent, either event-based or periodical with certain criteria and timing information configured for the under-/over-utilized measurement and reporting. The connected-mode UEs, upon receiving the measurement configuration, start the corresponding measurement and may send the under-/over-utilized report to the network when the report criteria are met.

FIG. 1 illustrates an exemplary implementation of a measurement and reporting procedure with common control signalling for the D2D discovery resource usage. The common D2D discovery resource usage measurement configuration may be applied for each UE (connected- or idle-mode) in a cell. The connected mode UEs may have a higher probability to send the measurement report to the network when report timing criteria is checked, as the connected mode UEs may get a UL transmission scheduling grant sooner than the idle-mode UEs. However, if there are no connected-mode UEs with the D2D capability in a certain local area, the idle-mode UEs may initiate RRC connection establishment and then send the report to the network. A base station eNB may receive multiple under-/over-use reports from UEs located in isolated geo-location areas within the cell, if a D2D discovery range is shorter than the cell size. In this case, eNB needs to take each report into account when the D2D discovery resource allocation is adjusted. For instance, eNB may allocate more D2D discovery resources if a single over-utilized report is received from a single UE compared to if multiple under-utilized reports are received from other UEs, as those reports may indicate that the density of D2D UEs is be higher in one local area than in other areas within the cell. As another example, if eNB receives over-utilized reports from cell-edge UEs, eNB may need to coordinate with neighboring cells to check e.g. whether the over-use of the D2D discovery resources is due to the interference from the neighboring cells, so that eNB may accordingly adjust the D2D discovery resource allocation to be either overlapping or non-overlapping with the D2D discovery resources of the neighboring cells.

An exemplary embodiment implements dedicated measurement control and report on the D2D discovery resource usage. If the network determines to use the dedicated control for the D2D discovery resource usage status measurement, it may disable the common control on the corresponding measurement by updating the system information, wherein the measurement and reporting configuration on the D2D discovery resource usage is omitted.

In an exemplary embodiment, if multiple type 1 D2D discovery resource pools are configured by the network, the measurement configuration and the report configuration are pool-specific. A different configuration may be defined for a different pool. From UE perspective, the measurement may be applied only to those D2D capable UEs that participate in the D2D discovery. In this way, the measurement is performed along with the D2D discovery and hence does not introduce additional processing overhead to UEs.

The allocated D2D discovery resources may comprise different pools and the configured parameters (the thresholds are on the basis of individual allocated resource pools as configured). The total number of allocated D2D discovery resources per each configured individual pool means the capacity of the pool. The measurement and reporting are therefore on the basis of individual resource pools configured as well. In case more than one pool is configured then UE may need to indicate pool information in its report as well. If the network configures a particular UE to measure and report a particular allocated pool (using dedicated signalling) then UE does not need to indicate the pool information in the report.

For reporting under- or over-utilized status, the exact measured value (the measured number of free or occupied resources or collision rate) or just an indication (1 bit) of under- or over utilized status may be used.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support D2D communication. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (or LTE-A) (long term evolution (advanced long term evolution)) network elements, without restricting the embodiment to such an architecture, however. The embodiments described in these examples are not limited to the LTE radio systems but can also be implemented in other radio systems, such as UMTS (universal mobile telecommunications system), GSM, EDGE, WCDMA, Bluetooth network, WLAN or other fixed, mobile or wireless network. In an embodiment, the presented solution may be applied between elements belonging to different but compatible systems such as LTE and UMTS.

Figure 2:
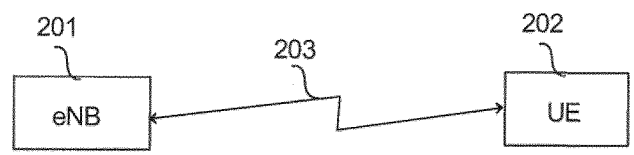
FIG. 2 shows a simplified block diagram illustrating exemplary system architecture.

A general architecture of a communication system is illustrated in FIG. 2. FIG. 2 is a simplified system architecture only showing some elements and functional entities, all being logical units whose implementation may differ from what is shown. The connections shown in FIG. 2 are logical connections; the actual physical connections may be different. It is apparent to a person skilled in the art that the systems also comprise other functions and structures. It should be appreciated that the functions, structures, elements and the protocols used in or for D2D communication, are irrelevant to the actual invention. Therefore, they need not to be discussed in more detail here.

The exemplary radio system of FIG. 2 comprises a network node 201 of a network operator. The network node 201 may include e.g. an LTE base station (eNB), radio network controller (RNC), or any other network element, or a combination of network elements. The network node 201 may be connected to one or more core network (CN) elements (not shown in FIG. 2) such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR). In FIG. 2, the radio network node 201 that may also be called eNB (enhanced node-B, evolved node-B) or network apparatus of the radio system, hosts the functions for radio resource management in a public land mobile network. FIG. 2 shows one or more user equipment 202 located in the service area of the radio network node 201. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 2, the user equipment 202 is capable of connecting to the radio network node 201 via a connection 203.

Figure 3:
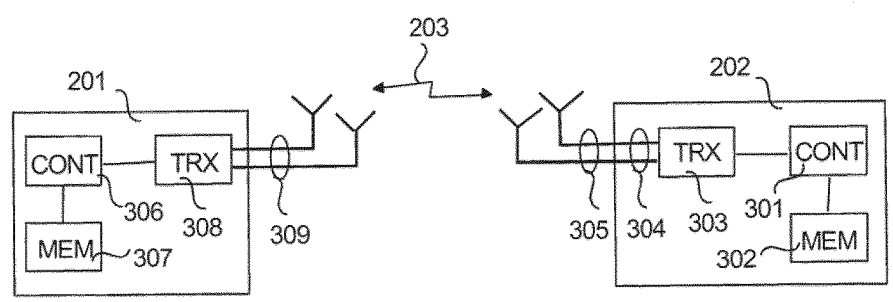
FIG. 3 shows a simplified block diagram illustrating exemplary apparatuses.

FIG. 3 is a block diagram of an apparatus according to an embodiment of the invention. FIG. 3 shows a user equipment 202 located in the area of a radio network node 201. The user equipment 202 is configured to be in connection 203 with the radio network node 201. The user equipment or UE 202 comprises a controller 301 operationally connected to a memory 302 and a transceiver 303. The controller 301 controls the operation of the user equipment 302. The memory 302 is configured to store software and data. The transceiver 303 is configured to set up and maintain a wireless connection 203 to the radio network node 201. The transceiver 303 is operationally connected to a set of antenna ports 304 connected to an antenna arrangement 305. The antenna arrangement 305 may comprise a set of antennas. The number of antennas may be one to four, for example. The number of antennas is not limited to any particular number. The user equipment 202 may also comprise various other components, such as a user interface, camera, and media player. They are not displayed in the figure due to simplicity. The radio network node 201, such as an LTE base station (eNode-B, eNB) comprises a controller 306 operationally connected to a memory 307, and a transceiver 308. The controller 306 controls the operation of the radio network node 201. The memory 307 is configured to store software and data. The transceiver 308 is configured to set up and maintain a wireless connection to the user equipment 202 within the service area of the radio network node 201. The transceiver 208 is operationally connected to an antenna arrangement 309. The antenna arrangement 309 may comprise a set of antennas. The number of antennas may be two to four, for example. The number of antennas is not limited to any particular number. The radio network node 201 may be operationally connected (directly or indirectly) to another network element (not shown in FIG. 3) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface. The embodiments are not, however, restricted to the network given above as an example, but a person skilled in the art may apply the solution to other communication networks provided with the necessary properties. For example, the connections be-tween different network elements may be realized with internet protocol (IP) connections.

Although the apparatus 201, 202 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 201, 202 may generally include a processor, controller, control unit or the like connected to a memory and to various interfaces of the apparatus. Generally the processor is a central processing unit, but the processor may be an additional operation processor. The processor may com-prise a computer processor, application-specific integrated circuit (ASIC), field-programmable gate array (FPGA), and/or other hardware components that have been programmed in such a way to carry out one or more functions of an embodiment.

The memory 302, 307 may include volatile and/or non-volatile memory and typically stores content, data, or the like. For example, the memory 302, 307 may store computer program code such as software applications or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus de-scribed with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

The signalling chart of FIG. 1 illustrates the required signalling. In the example of FIG. 1, an apparatus 201 such as a network node (e.g. an LTE/LTE-A base station eNB 201) broadcasts or transmits signalling in item 101. The signalling 101 includes measurement configuration information regarding a D2D discovery resource usage status. In item 102, the broadcasted or transmitted signalling 101 is received in an apparatus 202 (e.g. a D2D capable user terminal, UE), wherein, based on the received measurement configuration information, a corresponding measurement is performed 102 in the user terminal to determine a usage status of D2D discovery resources. In item 103, the user terminal 202 may check whether a D2D discovery resource over-use and/or under-use report criteria are met. In item 104, the user terminal UE 202 may check whether a D2D discovery resource under-utilized and/or over-utilized report timing criteria are met. In item 105, the user terminal 202 may transmit to the apparatus eNB 201 a report on the measurement 102 performed in the user terminal, the report indicating the usage status of D2D discovery resources. In item 106, the apparatus eNB 201 may receive the report from the D2D capable user terminal 202, and adjust D2D discovery resource allocation based on the received report. In item 107, the user terminal 202 may transmit an indication of the sending of the report 105, wherein a report sending indication is included in a D2D discovery message to inform other user terminals that an under-utilised or overutilized D2D discovery resources report has been sent to the network apparatus.

Figure 4:
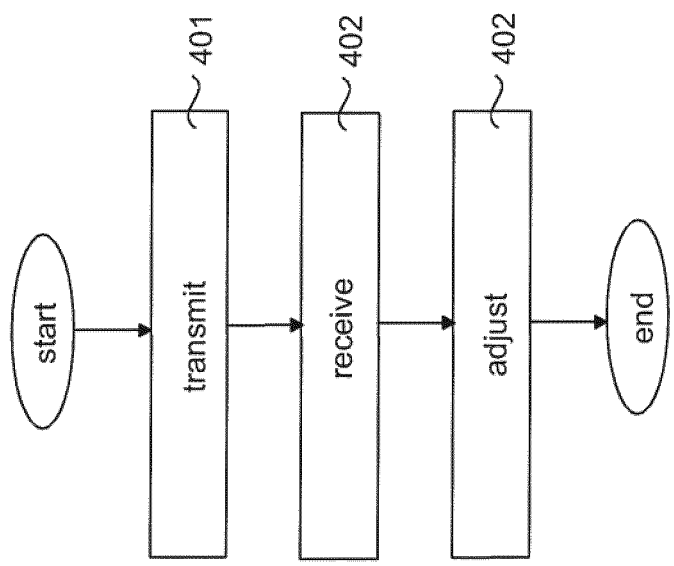
FIG. 4 shows a schematic diagram of a flow chart according to an exemplary embodiment of the invention.

FIG. 4 is a flow chart illustrating an exemplary embodiment. The apparatus 201 (which may comprise e.g. an LTE/LTE-A base station), may broadcast or transmit signalling in item 401. The signalling 401 includes measurement configuration information regarding a D2D discovery resource usage status. In item 402, the apparatus 201 may receive from an apparatus 202 (e.g. a D2D capable user terminal, UE) a report on a D2D discovery resource usage measurement performed in the user terminal 202, the report indicating a usage status of D2D discovery resources. In item 403, the apparatus 201 may adjust D2D discovery resource allocation based on the received report.

Figure 5:
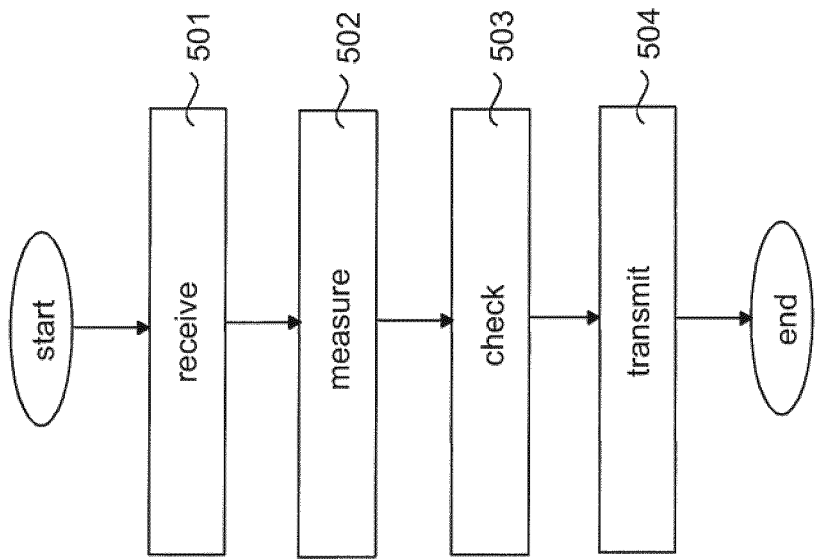
FIG. 5 shows a schematic diagram of a flow chart according to another exemplary embodiment of the invention.

FIG. 5 is a flow chart illustrating an exemplary embodiment. The apparatus 202 (which may comprise e.g. a D2D capable user terminal UE 202), may receive signalling in item 501 from an apparatus 201 (which may comprise e.g. an LTE/LTE-A base station, eNB 201). The signalling includes measurement configuration information regarding a D2D discovery resource usage status. In item 502, based on the received measurement configuration information, a corresponding measurement is performed 102 in the user terminal 202 to determine a usage status of D2D discovery resources. In item 503, the user terminal 202 may check whether a D2D discovery resource over-use and/or under-use report criteria are met, and whether a D2D discovery resource under-utilized and/or over-utilized report timing criteria are met. In item 504, the user terminal UE 202 may transmit to the apparatus eNB 201 a report on the measurement 502 performed in the user terminal 202, in order the apparatus eNB 201 to be able to adjust D2D discovery resource allocation based on the report. The measurement configuration information may define criteria based on which the user terminal is able to check (by comparing the result of the measurement to the criteria) and decide whether to send the measurement report to the apparatus eNB 201.

The steps/points, signalling messages and related functions de-scribed above in FIGS. 1 to 5 are in no absolute chronological order, and some of the steps/points may be performed simultaneously or in an order differing from the given one. Other functions can also be executed between the steps/points or within the steps/points and other signalling messages sent be-tween the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

D2D device-to-device communications
ProSe proximity service
UE user equipment
ID identifier
C-RNTI cell radio network temporary identifier

The invention claimed is:
1. A method for D2D communication in a communications system, the method comprising:
transmitting, from a network apparatus to a D2D-capable user terminal, measurement configuration information regarding a D2D discovery resource usage status;
receiving, in the network apparatus from the D2D-capable user terminal, a report on a corresponding measurement performed in the user terminal, the report indicating the D2D discovery resource usage status; and
adjusting D2D discovery resource allocation based on the received report,
wherein the allocated D2D discovery resources comprise resource pools and configured parameters, and wherein the total number of allocated D2D discovery resources per each configured individual resource pool corresponds to the capacity of the pool.

2. A method for D2D communication in a communications system, the method comprising:
receiving, in a D2D-capable user terminal from a network apparatus, measurement configuration information regarding a D2D discovery resource usage status;
performing, based on the received measurement configuration information, a corresponding measurement in the user terminal to determine the D2D discovery resource usage status; and
transmitting, to the network apparatus from the user terminal, a report on said measurement performed in the user terminal, the report indicating the D2D discovery resource usage status, in order to enable the network apparatus to adjust D2D discovery resource allocation based on the report, wherein the allocated D2D discovery resources comprise resource pools and configured parameters, and wherein the total number of allocated D2D discovery resources per each configured individual resource pool corresponds to the capacity of the pool.

3. The method according to claim 1, characterized in that the measurement configuration information regarding the D2D discovery resource usage status is transmitted by using common control signaling or broadcasted system information.

4. The method according to claim 2, characterized in that a report on underutilization or overutilization of D2D discovery resources is sent from the user terminal to the network apparatus.

5. The method according to claim 1, characterized in that a measurement configuration includes a D2D discovery resource underutilized report triggering, wherein the method further comprises at least one of:
 defining a threshold value for the number of free discovery resources versus a total number of D2D discovery resources, above which a D2D discovery resource underutilized report is triggered; and
 defining a threshold value for a total number of allocated D2D discovery resources under which the D2D discovery resource underutilized report is not triggered.

6. The method according to claim 1, characterized in that a measurement configuration includes a D2D discovery resource overutilized report triggering, wherein the method further comprises at least one of:
 defining a threshold value for the number of occupied D2D discovery resources versus a total number of allocated D2D discovery resources above which a D2D discovery resource overutilized report is triggered;
 defining a threshold value for a detected collision rate above which the D2D discovery resource overutilized report is triggered; and
 defining a threshold value for a total number of allocated D2D discovery resources above which the D2D discovery resource overutilized report is not triggered.

7. The method according to claim 2, characterized in that the method further comprises indicating resource pool information in the report transmitted from the user terminal, in case more than one pool is configured for the user terminal.

8. The method according to claim 2, characterized in that a report on underutilized status or overutilized status includes an exact measured value of the number of free or occupied resources or the collision rate, or an indication of the underutilized status or overutilized status.

9. The method according to claim 1, characterized in that a measurement configuration includes at least one of a D2D discovery resource underutilized report timing and a D2D discovery resource overutilized report timing, wherein the method further comprises:
 defining a number of subframes before a next D2D discovery message transmission within which at least one of a D2D discovery resource underutilized report and a D2D discovery resource overutilized report can be sent to a network, respectively.

10. The method according to claim 1, characterized in that a measurement configuration includes a D2D discovery resource underutilized report interval or a D2D discovery resources overutilized report interval, wherein the method further comprises:
 defining a minimum time period between two identical reports transmitted from the user terminal in the coverage area of the network apparatus when system information regarding a D2D discovery resource pool is not updated.

11. The method according to claim 2, characterized in that, for a D2D discovery resource overutilized report, an allocated D2D discovery resource pool or a subset thereof, in which overuse has been identified, is also reported to the network apparatus, wherein the overuse is either in the form of an occupied resource or a detected collision.

12. The method according to claim 2, characterized in that, to avoid unnecessary duplicated reports from multiple D2D capable user terminals in the proximity of the network apparatus, only a D2D discovery resource underutilized report or a D2D discovery resource overutilized report within a configured number of subframes is sent from the user terminal before next D2D discovery message transmission, wherein a report sending indication is included in D2D discovery messages to inform other user terminals that said D2D discovery resource underutilized report or said D2D discovery resource overutilized report has been sent to the network apparatus.

13. The method according to claim 12, characterized in that other D2D-capable user terminals, upon detecting the report sending indication in a D2D discovery message of a first user terminal, refrain from sending the D2D discovery resource underutilized report or the D2D discovery resource overutilized report within the D2D discovery resources report interval configured by the network apparatus, even when a respective configured triggering condition is met, unless broadcasted system information regarding a D2D discovery resource pool has changed.

14. The method according to claim 1, characterized in that the method further comprises using dedicated signaling to configure selected connected-mode user terminals to perform the measurement and provide a corresponding report.

15. An apparatus comprising;
 at least one processor; and
 at least one memory including a computer program code, characterized in that the at least one memory and the computer program code are configured, with the at least one processor, to cause the apparatus to perform at least the following:
 transmitting, from a network apparatus to a D2D-capable user terminal, measurement configuration information regarding a D2D discovery resource usage status;
 receiving, in the network apparatus from the D2D-capable user terminal, a report on a corresponding measurement performed in the user terminal, the report indicating the D2D discovery resource usage status; and
 adjusting D2D discovery resource allocation based on the received report,
 wherein the allocated D2D discovery resources comprise resource pools and configured parameters, and wherein the total number of allocated D2D discovery resources per each configured individual resource pool corresponds to the capacity of the pool.

16. A computer program product comprising program instructions which, when run on a computing apparatus, causes the computing apparatus to perform a method according to claim 1.

17. A computer program product comprising program instructions which, when run on a computing apparatus, causes the computing apparatus to perform a method according to claim 2.

18. The apparatus according to claim 15, wherein a measurement configuration includes at least one of a D2D discovery resource underutilized report timing and a D2D discovery resource overutilized report timing, wherein the at least one memory and the computer program code are further configured, with the at least one processor, to cause the apparatus to perform at least the following:

defining a number of subframes before next D2D discovery message transmission within which at least one of a D2D discovery resource underutilized report and a D2D discovery resource overutilized report can be sent to a network, respectively.

19. The apparatus according to claim 15, wherein the at least one memory and the computer program code are further configured, with the at least one processor, to cause the apparatus to perform at least the following:

using dedicated signaling to configure selected connected-mode user terminals to perform the measurement and provide a corresponding report.

* * * * *